United States Patent [19]
Kondo

[11] 4,210,094
[45] Jul. 1, 1980

[54] RADIO TUNER FOR COUPLING WITH CASSETTE TAPE RECORDER

[75] Inventor: Shiro Kondo, Tama, Japan

[73] Assignee: Olympus Optical Co., Ltd., Tokyo, Japan

[21] Appl. No.: 912,072

[22] Filed: Jun. 5, 1978

Related U.S. Application Data

[62] Division of Ser. No. 741,156, Nov. 11, 1976.

[30] Foreign Application Priority Data

Apr. 30, 1976 [JP] Japan .................................. 51-55416
Apr. 30, 1976 [JP] Japan .................................. 51-55417

[51] Int. Cl.$^2$ .......................... G11B 31/00; H03J 1/02
[52] U.S. Cl. ................................ 116/255; 179/100.11; 74/10.7; 455/157; 455/344
[58] Field of Search ............... 116/241, 261, 262, 278, 116/256, 248, 249, 254, 255; 179/100.11; 74/10.45, 10.7

[56] References Cited

U.S. PATENT DOCUMENTS

| | | | |
|---|---|---|---|
| 1,752,071 | 3/1930 | Doyle | 116/278 X |
| 2,539,458 | 1/1951 | Myers | 116/262 X |
| 3,416,486 | 12/1968 | Mongesku | 116/262 |
| 3,521,010 | 7/1970 | Sato | 360/137 |
| 3,592,158 | 7/1971 | Gear | 116/278 X |
| 3,916,122 | 10/1975 | Sato et al. | 325/311 |

FOREIGN PATENT DOCUMENTS

| | | | |
|---|---|---|---|
| 128865 | 8/1948 | Australia | 116/262 |
| 100723 | 4/1937 | United Kingdom | 116/262 |

*Primary Examiner*—Daniel M. Yasich
*Attorney, Agent, or Firm*—Ostrolenk, Faber, Gerb & Soffen

[57] ABSTRACT

A radio tuner for detachably coupling with a cassette tape recorder is disclosed, and forms a radio set when connected with a source battery, an amplifier and a loudspeaker contained within the recorder. The tuner has a casing which is molded from a synthetic resin material and which receives a bar antenna for reception of AM broadcasts. One of the sidewalls of the tuner casing, located at right angles to its mating surface with the recorder, has a rod antenna for reception of an FM broadcast mounted thereon, while a knob associated with a station selecting dial is mounted on the other sidewall. The dial is located on one of the major surfaces of the tuner casing, and is coupled with the knob through a fastening string which is caused to run in mutually perpendicular directions by means of a diverting member having a pair of string engaging portions.

1 Claim, 10 Drawing Figures

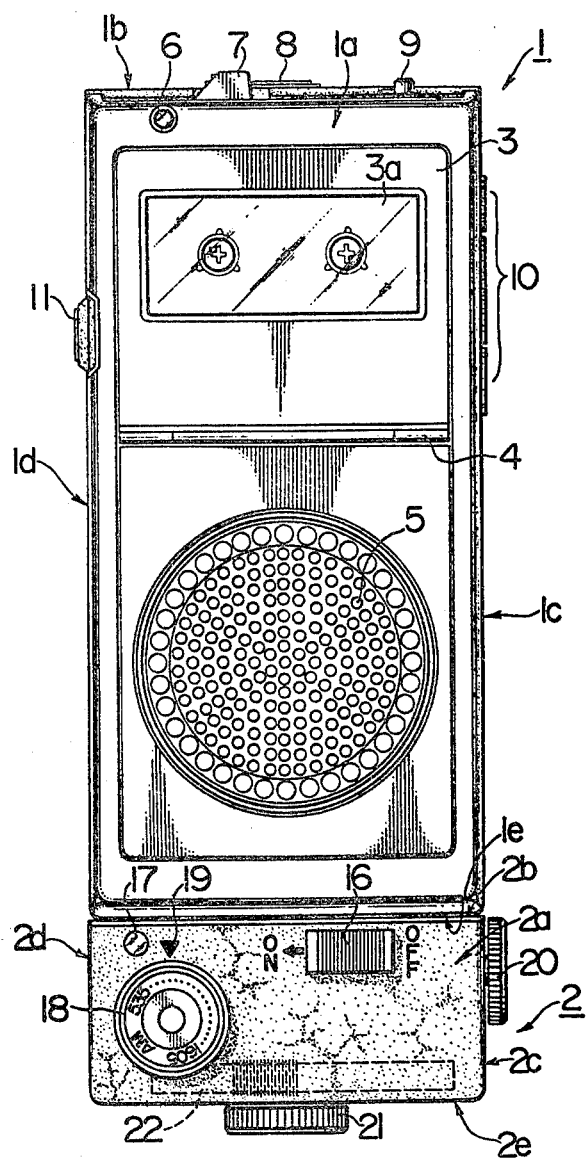

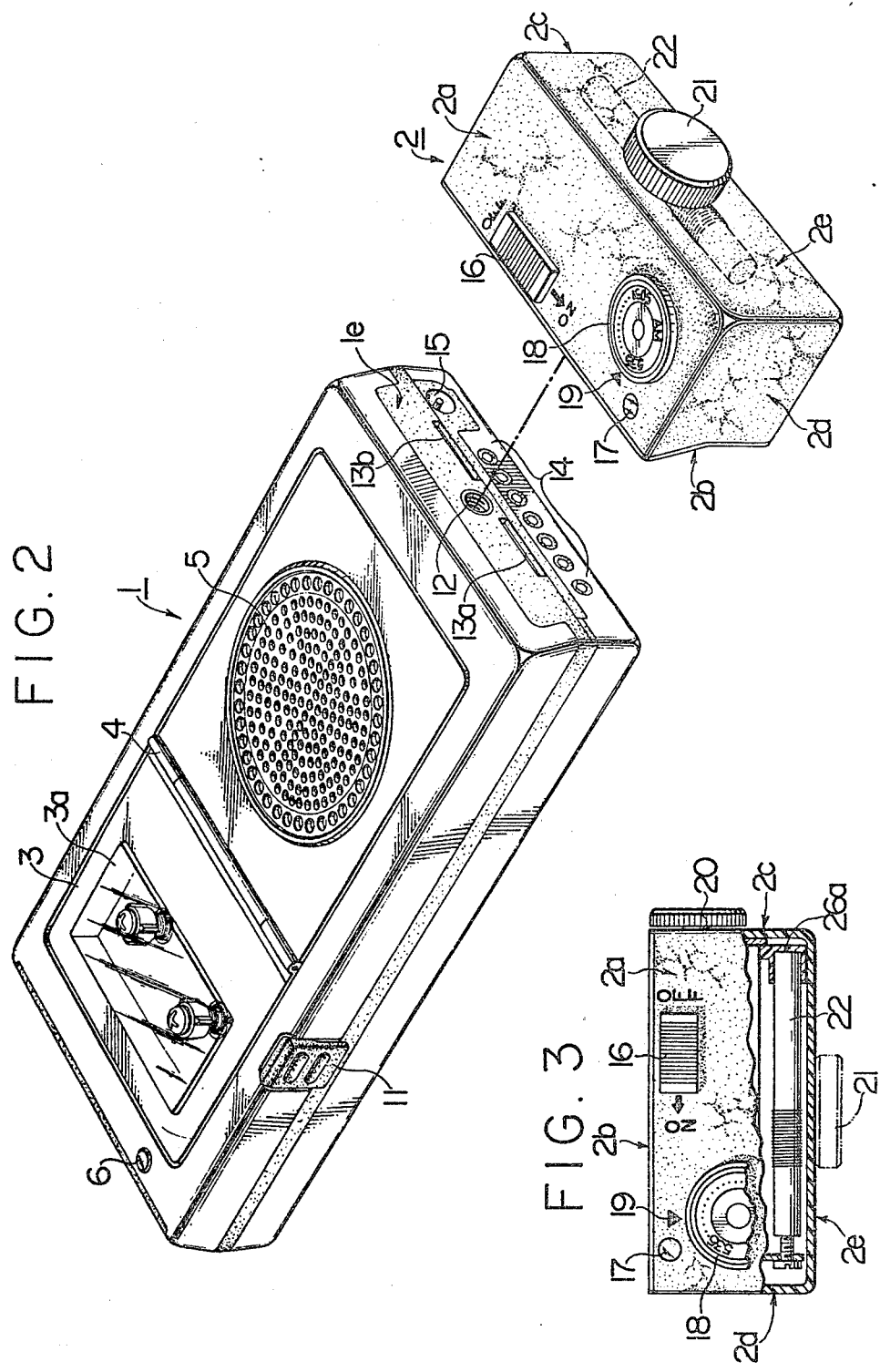

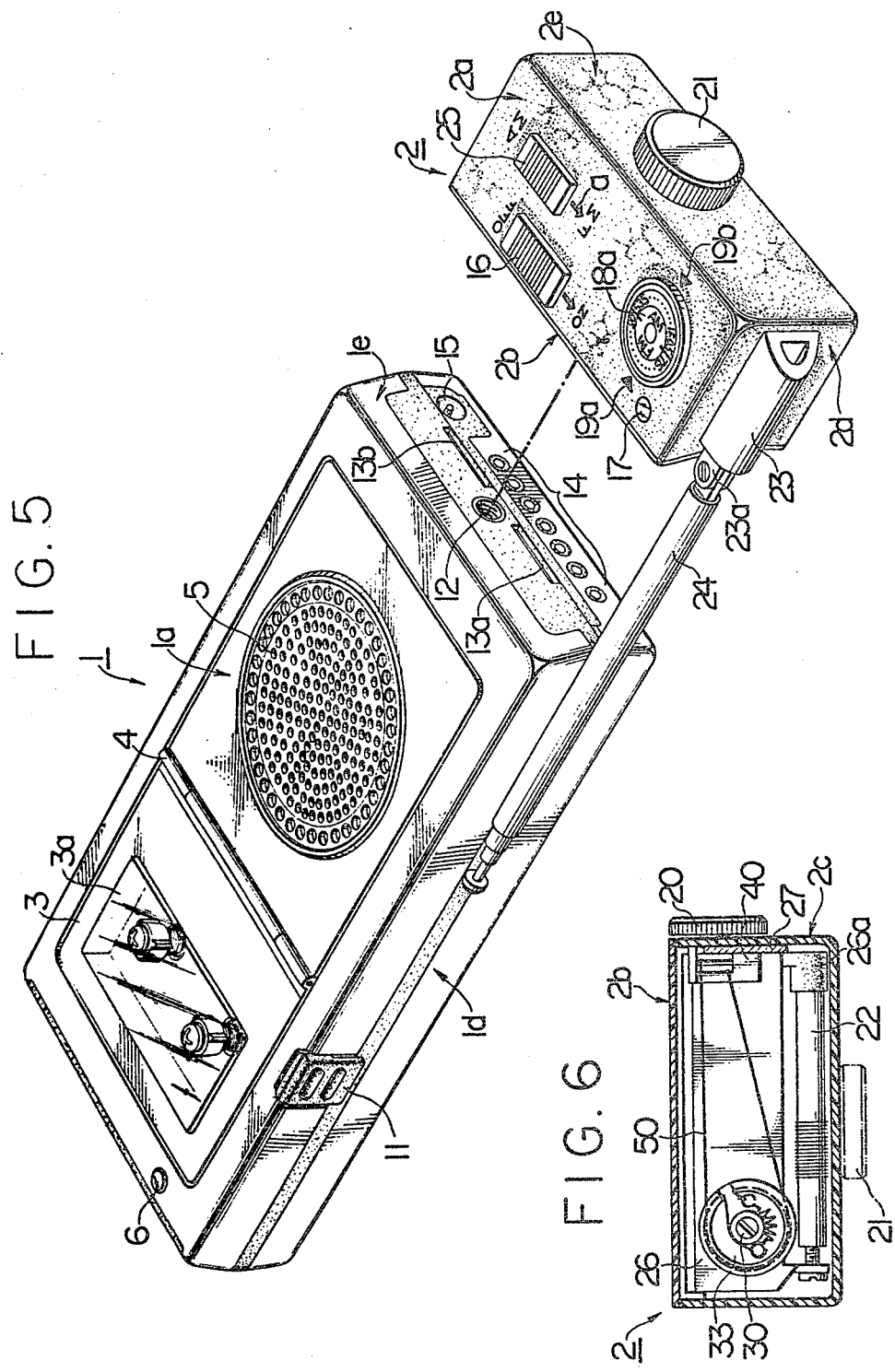

RADIO TUNER FOR COUPLING WITH CASSETTE TAPE RECORDER

RELATED APPLICATIONS

This is a divisional of U.S. patent application Ser. No. 741,156, filed Nov. 11, 1976.

BACKGROUND OF THE INVENTION

The invention relates to a radio tuner for coupling with a cassette tape recorder, and more particularly to a radio tuner of the type which is detachably coupled with a cassette tape recorder of a small size.

With the wide-spread use of portable radio sets and increasing miniaturization of cassette tape recorders, a cassette tape recorder with a radio set is available on the market which provides the combined functions of both units. However, the available cassette tape recorder with radio set comprises a combination of the individual units, and therefore has a size which is of the order of several times that of the tape recorder. At best, they are not pocket-size. The present applicant has previously devloped a cassette tape recorder of a miniature size employing a micro-cassette which can be received in the pocket of a shirt. Thus it will be convenient if a radio set can be provided which is detachably coupled with such recorder and which has an overall size substantially comparable to the size of such recorder. This could be accomplished by providing a tuner of a compact form which only incorporates the tuner circuit of the radio set while utilizing the source battery, loudspeaker and amplifier circuit contained within the tape recorder in order to constitute together a composite radio set and which can be detachably coupled with the recorder to form a radio set of pocket-size dimensions. Techniques to achieve such a combined unit are already known. However, to assure a full functioning of a minature tape recorder which represents a precision product, the recorder has a casing formed of a metal material such as aluminium sheet. A problem then arises in that if the tuner casing is formed by a metal, an impinging electromagnetic wave will be shielded from an internally housed antenna, thus preventing or detracting from the effective functioning of a radio set.

The tuner of such a size could accommodate a bar antenna which is utilized to receive an AM broadcast, but cannot accommodate a rod antenna of substantial length which is used to receive an FM broadcast. If the rod antenna is disposed outside the tuner casing, it will detract from the appearance and the pocket-size of the combination comprising the tuner and the tape recorder.

On the other hand, when a radio tuner of the form mentioned above is constructed, considerations concerning the ease of operation, portability and design dictate that a frequency selecting dial be disposed on the major surface of the tuner while an operating knob associated with the dial be disposed on its lateral side. Normally, the dial and the knob are interconnected by a fastening string which is passed around rollers or pulleys interposed therebetween. However, when the dial and the knob rotate in different planes which are at right angles to each other, the fastening string must be diverted in mutually perpendicular directions. This results in a complex arrangement for the construction and mounting of intermediate rollers or pulleys, which cannot be contained within the tuner casing of the small size as mentioned above. Additionally, it becomes extremely difficult to provide a stable and proper motion transmission from the knob to the dial.

SUMMARY OF THE INVENTION

It is an object of the invention to overcome the above disadvantages by providing an AM radio tuner of a size compatible with a cassette tape recorder and which is detachably coupled therewith to utilize a source battery, an amplifier and a loudspeaker contained therein to form a radio set, with a bar antenna internally housed within the tuner casing to permit reception of an AM broadcasting.

It is another object of the invention to provide an FM radio tuner which is detachably coupled with a cassette tape recorder and having a rod antenna for reception of an FM broadcast mounted on the sidewall of the casing thereof.

It is a further object of the invention to provide a radio frequency tuning device for a radio tuner which is adapted to be detachably coupled with a cassette tape recorder and wherein a radio frequency selecting dial and a dial operating knob is interconnected by a fastening string which is guided by a diverting member.

In accordance with the invention, the AM radio tuner has a casing which is formed of an insulating material such as a plastic material and which internally houses a bar antenna for reception of an AM broadcast, at a position most spaced from the tape recorder when the tuner is coupled therewith. In this manner, a broadcast wave can reach the bar antenna within the casing without being shielded by the latter, thus assuring a satisfactory reception of an AM broadcast.

The FM radio tuner according to the invention has a rod antenna mounted on the sidewall thereof and which maintains a telescoped position of a reduced length to be disposed along one side of the casing of the tape recorder when the tuner is coupled with the cassette tape recorder, thereby maintaining the pocket-size dimensions of the combination.

In accordance with the invention, the radio frequency selecting dial is disposed on one of the major surfaces of the tuner casing while the dial operating knob is disposed on one of the sidewalls thereof. The dial and the knob are interconnected by a fastening string which is guided by a diverting member located therebetween for changing its running directions in perpendicular directions. Instead of using a rotating member such as a roller or pulley, the diverting member comprises a simple construction having a pair of stationary string engaging portions, each having a smooth surface, thus providing a positive diversion of the running direction of the fastening string.

BRIEF DESCRIPTION OF THE DRAWINGS

FIG. 1 is a plan view of the AM radio tuner according to the invention as it is coupled with a cassette tape recorder of a miniature size;

FIG. 2 is a perspective view of the tuner shown in FIG. 1 as separated from the cassette tape recorder;

FIG. 3 is a plan view, partially broken away, of the tuner shown in FIG. 1;

FIG. 5 is a perspective view of the tuner shown in FIG. 4 as separated from the cassette tape recorder;

FIG. 6 is a plan view of one embodiment of the radio frequency tuning device according to the invention;

DETAILED DESCRIPTION OF PREFERRED EMBODIMENTS

Figure 4:
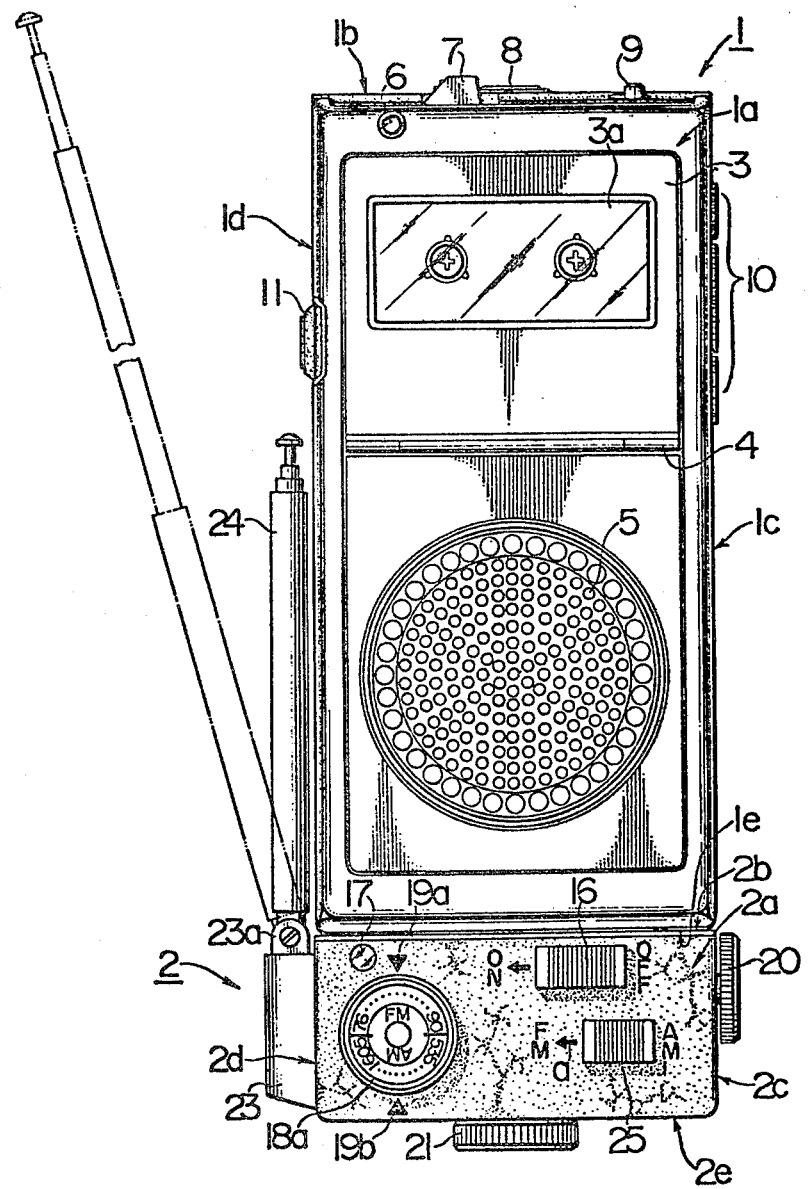
FIG. 4 is a plan view of the FM radio tuner according to the invention as it is coupled with a cassette tape recorder of a miniature size.

Referring to FIG. 1, there is shown an AM radio tuner constructed in accordance with the invention which is detachably coupled with a cassette tape recorder of a miniature size, which is developed by the present applicant and which utilizes a micro-cassette of a known form. The tape recorder 1 is of a rectangular form, the substantial part of which is received in a casing formed of a metal such as an aluminium sheet. The front surface 1a of the recorder has a lid 3 for covering a cassette receiving chamber and which is pivotally mounted at hinge 4, the lid being formed with a transparent sight window 3a for allowing the internally housed cassette tape to be viewed therethrough. A plurality of small openings 5 which are located to correspond to the opening of a loudspeaker is formed in the lower part of the casing, while a lamp window 6, which serves a battery voltage checking and a record mode indication, is provided in the uppermost portion of the casing toward the left-hand end. The front sidewall 1b, or the top end as viewed in this Figure, is provided with an operating knob 7 for tape rewind and rapid advance, a grille 8 for an internally housed microphone and a power switch 9. A group of operating buttons 10 for performing a record/a playback or a stop operation of the tape recorder 1 are mounted on the right-hand sidewall 1c in the upper portion thereof. An operating knob 11 for opening the lid 3 to eject a cassette tape, not shown, which is loaded into the tape recorder, is mounted on the left-hand sidewall 1d.

As shown in FIG. 2, the rear sidewall of the tape recorder 1 is formed as a mating surface 1e for abutment against a mating surface 2b of the radio tuner 2 in order to connect both units together. To facilitate the abutment, the mating surface 1e is formed as a curved surface which is convex in the rearward direction. A threaded bore 12 for threadably engagement with the tuner 2 is formed centrally in the upper portion of the curved wall surface, and a pair of recesses 13a, 13b are located symmetrically on the opposite sides of the bore 12 for engagement with corresponding projections, not shown, provided on the part of the tuner 2 in order to prevent relative rotation between the tuner and the recorder when the tuner is abuttingly engaged with the recorder. A jack 15 for connection with an AC adaptor is located toward the right-hand end of the rearwall 1 at a lowermost position, and a plurality of electrical contacts 14 are formed in the lower portion of the curved wall for interconnecting the electrical circuit of the recorder 1 with the electrical circuit of the tuner 2. These contacts are adapted to engage corresponding electrical contacts, not shown, provided on the part of the tuner 2 when the units are coupled together.

The casing of the radio tuner 2 is formed of an insulating material such as a plastic material, and has a dimension which is of the order of one-fourth the size of the recorder 1. In addition, the configuration of the tuner is formed such that its lateral sidewalls are substantially aligned with the corresponding sidewalls of the recorder 1 when the tuner is coupled with the latter. Contained within the tuner casing is a high frequency amplifier, a frequency mixer, an oscillator, an intermediate frequency amplifier and a detector as well as related parts. A radio set is formed by combining these circuits with a source battery, a loudspeaker and an audio amplifier, all now shown, contained in the recorder 1.

The front wall of the tuner casing is formed as a mating surface 2b for abutment against the mating surface 1e of the recorder, and is shaped as a concave surface corresponding to the convex surface on the tape recorder 1. A connection screw extends through the mating surface 2b for engagement with the threaded bore 12 in the mating surface 1. In addition, the mating surface 2b is formed with a pair of positioning projections adapted to engage the recesses 13a, 13b as well as a group of electrical contacts, not shown, which are adapted to engage with individual contacts in the group 14 of the recorder. The tuner 2 has an upper surface 2a in which a radio operating switch button 16 is provided at a location close to the mating surface 2b while an AM tuning dial 18 associated with an index 19 is located in the left-hand portion of the upper surface. A knob 20 for operating the dial 18 is mounted on the right-hand sidewall of the tuner casing (see FIG. 1). The connection screw extends through the tuner casing and is provided with a operating knob 21 which is centrally located on the rear sidewall 2e of the tuner casing.

A bar antenna 22 for reception of an AM broadcast is disposed within the tuner 2. As shown in FIG. 3, the antenna 22 is located adjacent to the inner surface of the rear wall 2e of the tuner casing and is supported by a support member 26a so as to extend parallel to the rear wall. While the construction of such a bar antenna is in itself known, its location most remote from the recorder 1, combined with the use of the tuner casing which is formed of a plastic material, minimizes the shielding effect of the metal casing of the tape recorder 1 upon an electromagnetic wave, thereby enabling effective interception thereof.

FIGS. 4 and 5 show a tuner 2 which incorporates an FM tuner in addition to the AM tuner shown in FIGS. 1 to 3. Mounted on the surface 2a of the tuner casing is a radio operating switch button 16 located near the mating surface 2b in the right-hand portion thereof while an AM/FM changeover switch 25 is mounted on the same surface 2a adjacent to the button 16. A lamp 17 indicative of a radio operation is disposed in the surface 2a in the upper left-hand portion thereof while an FM/AM tuning dial 18a associated with a pair of indices 19a, 19b are mounted thereon in the left-hand portion thereof. A knob 20 (see also FIGS. 1 and 4) for operating the dial 18a is mounted on the right-hand sidewall 2c while a knob 21 for operating a connection screw is centrally mounted on the rear sidewall 2e. A mounting member 23 for a rod antenna is mounted centrally along the left-hand sidewall 2d so as to extend parallel thereto, as shown in FIGS. 4 and 5. At its end adjacent to the mating surface 2b, the mounting member 23 has a mount 23a which rotatably carries one end of a rod antenna 24 for swingable movement over 90° in a horizontal plane shown in FIG. 5. The mount 23a may be replaced by a ball joint, for example, so as to permit rotation thereof in all directions over an angle exceeding 90°.

When the rod antenna 24 is mounted on the tuner 2 in this manner, the antenna in its telescoped position of a reduced length extends along the left-hand sidewall 1d of the tape recorder as shown in solid line in FIG. 4, when the tuner 2 is coupled with the tape recorder 1, thereby achieving a pocket-size assembly comprising the miniature cassette tape recorder 1 and the AM/FM tuner 2. When it is desired to operate the assembly as an FM radio set, the rod antenna 24 may be extended to its full length and turned to a position as indicated in phantom line 24'. This completely avoids the adverse influence of the metal casing of the tape recorder 1 upon the reception of an electromagnetic wave, thus assuring a satisfactory reception of an FM broadcast without interference. It will be noted that instead of mounting the pivotal end of the rod antenna 24 on the left-hand sidewall of the tuner casing, it may also be mounted on the right-hand sidewall 2c of the tuner casing so as to extend along the right-hand sidewall 1c of the tape recorder 1, with the knob 20 transferred onto the left-hand sidewall 2d. The radio tuner 2 may comprise a tuner adapted for the reception of FM waves.

Figure 7:
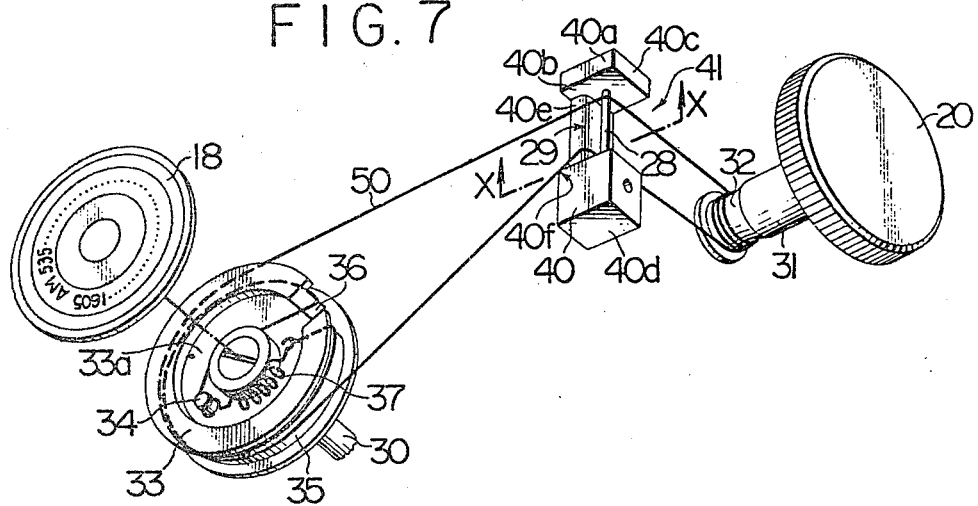
FIG. 7 is an enlarged perspective view of the mechanism shown in FIG. 6.

Now a radio frequency tuning device, which couples the dial (FIG. 3) rotatably mounted in the surface 2a of the tuner casing and the knob 20 mounted at the right-hand sidewall 2c of the tuner casing, will be described in detail. As shown in FIGS. 6 and 7, the tuning device comprises a pulley 33, a dial operating shaft 31, a diverting member 40 and a fastening string 50, in addition to the dial 18 and the knob 20. The fastening string 50 provides a mechanical coupling between the dial 18 and the knob 20 in order to transmit the rotation of the knob 20 to the dial 18. The fastening string extends around the diverting member 40 so as to extend in perpendicular directions on the opposite sides thereof, as shown in FIG. 7.

Figure 9:
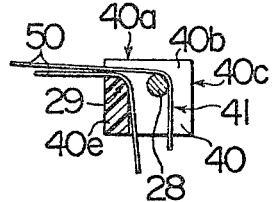
FIG. 9 is an enlarged cross-section taken along the line X—X shown in FIG. 7.

As shown in FIG. 6, the diverting member 40 is mounted on a mounting plate 27 so as to be parallel to the right-hand sidewall 2c of the tuner casing. A chassis 26 is fixedly mounted within the tuner casing and has its right-hand end folded at right angles, to which the mounting plate 27 is attached. The diverting member 40 is disposed in a right-angled corner formed by the surface 2a of the tuner casing and the right-hand sidewall 2c, and is formed of a plastic material having an elongate rectangular configuration. The upper surface of the diverting member is located adjacent to the mating surface 2b of the tuner casing in parallel relationship therewith, with its front surface 40a located above the surface of the chassis 26 in parallel relationship with the surface 2a of the tuner casing. Its right-hand surface 40c is located close to and parallel with the right-hand sidewall 2c of the tuner casing. The diverting member 40 is lengthwise relieved along the two adjoining surfaces 40a and 40c so that its upper and lower portions 40b, 40d are interconnected by a remaining pillar portion 40e. The member 40 is more deeply relieved in the right-hand surface 40c than in the front surface 40a to provide the pillar portion 40e which is substantially parallellelogram in cross section, as indicated in FIG. 9. The diverting member 40 is formed with a pair of string engaging portions. One of the string engaging portions, 29, is formed by an arcuate, smooth surface which is formed by relieving the edge of the pillar 40e which is located within the relieved space 41. The other string engaging portion is formed by a metal rod 28 which has its upper and lower ends secured to the upper and lower portions 40b, 40d of the diverting member and extends in parallel relationship with the pillar portion 40e. The metal rod 28 is finished to provide a smooth peripheral surface, and is located slightly nearer the front surface 40a than the string engaging portion 29. In this manner, the fastening string 50 engages the respective string engaging portions 28, 29 in two different planes. The upper, left-hand edge of the lower portion 40d of the diverting member 40 is also relieved to provide a guide 40f having a curved surface, thereby facilitating smooth movement of the fastening string 50.

Figure 8:
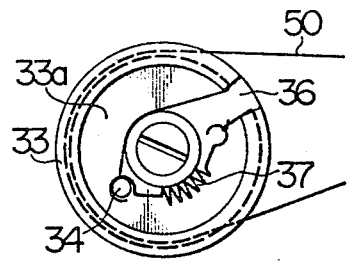
FIG. 8 is a plan view of a pulley shown in FIGS. 6 and 7 which is engaged by the fastening string.

The pulley 33 is disposed on the left-hand end of the chassis 26, and is fixedly mounted on the shaft 30 which is mechanically associated with a variable capacitor, not shown, and which rotatably extends through the chassis 26. As shown in FIGS. 7 and 8, the pulley 33 has a central recess 33a in its upper surface, and a pin 34 is fixedly mounted in the recess 33 for anchoring the opposite ends of the connection or fastening string 50. The pulley 33 is peripherally formed with a groove 35. A notch 36 is formed along part of the periphery of the groove for passing the ends of the connection string 50 therethrough for anchoring them to the pin 34. One end of the connection string 50 is directly secured to the pin while the other end is secured thereto with a tension spring 37 interposed therebetween for maintaining the connection string 50 in a taut condition.

The dial operating shaft 31 is rotatably mounted on the mounting plate 27 and extends therethrough in a direction perpendicular thereto. The left-hand end of the shaft 31 is formed with a groove 32 of a reduced diameter. As mentioned previously, one end of the connection or fastening string 50 is anchored to the pin 34, and is then passed through the notch 36 into the groove 35. After extending counterclockwise nearly one turn around the pulley 33, the string 40 is passed over the string engaging portion 29 of the diverting member 40 to be diverted at right angles, and thence wound several turns around the groove 32 formed in the shaft 31 associated with the knob 20. Subsequently, it is pulled forward to be engaged with the other string engaging portion 28 of the diverting member 40 to be diverted at right angles again and thence engaged with the groove 35 in the pulley 33 to be wound counter-clockwise therearound. Finally, the end of the connection string 50 is connected with one end of the tension spring 37, the other end of which is secured to the pin 34.

The diverting action of the member 40 and the smooth guide surfaces of the string engaging portions 28, 29 enable a smooth sliding movement of the connection string 50 to transmit the rotation of the knob 20 to the pulley 33 in a positive manner while maintaining it in a taut condition as a result of the tension spring 37. The dial 18 is applied to the forward surface of the pulley 33 for integral and precise rotation together with the pulley 33. The tuning device described above is extremely simple in construction and reduces the cost as compared with a prior arrangement which employs rollers or pulleys.

When the tuner 2 is used in combination with the tape recorder, the mating surfaces 1e and 2b are brought into abutting relationship against each other to align the interconnecting screw, not shown, with the threaded bore in the tape recorder, to align the projections, not shown, provided on the part of the tuner, with the pair of recesses 13a, 13b and to align the group of electrical contacts (not shown) provided on the part of the tuner with the corresponding group of electrical contacts 14, respectively. Subsequently, the knob 21 which is connected with the interconnecting screw is turned to achieve its threadable engagement with the threaded bore 12. Thereupon, the pair of projections and recesses (the projections engaging the recesses 13a, 13b are not shown) fit each other to provide a positive coupling therebetween. At the same time, the group of electrical contacts on the respective units are engaged with each other, providing an interconnection between the electrical circuit of the tape recorder 1 and the electrical circuit of the tuner 2. In this manner, a source battery, a loudspeaker and an amplifier, all not shown, which are contained within the tape recorder 1 can be electrically connected with the electrical circuit of the tuner to form together a radio set.

When the switch button 6 is moved in the direction of the arrow to turn on the assembly, the lamp 17 is illuminated, indicating an operating condition of the radio set. The frequency tuning takes place by turning the knob 20 to rotate the dial 18 so that a particular frequency indication on the scale marked on the periphery thereof be aligned with the index 19. When the FM tuner is to be used, the rod antenna 24 is extended to its full length, and the AM/FM changeover switch 25 is moved in the direction of an arrow a. When the radio set is not used, the switch button 16 may be turned off, permitting the assembly to be used as a pocket-size tape recorder. Of course, the tuner 2 may be disengaged from the recorder when using the latter alone.

Figure 10:
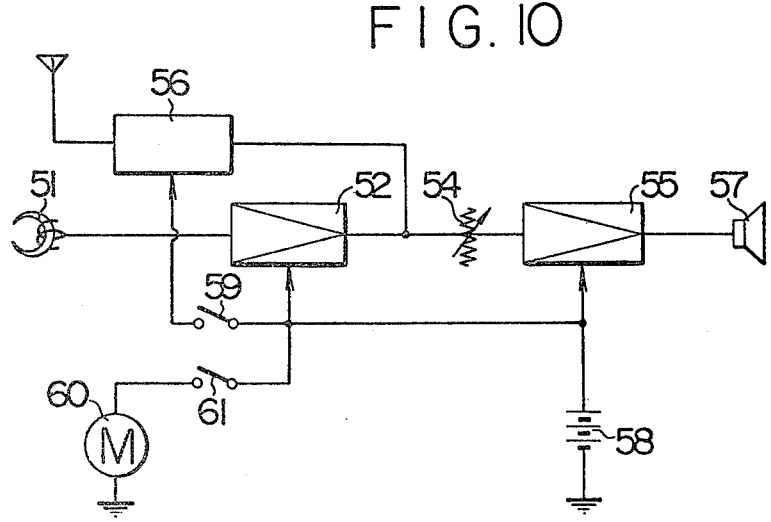
FIG. 10 is a circuit diagram of one exemplary circuit formed by the tape recorder and the radio tuner.

FIG. 10 shows a circuit diagram of a composite electrical circuit which is constituted by the individual electrical circuits of the recorder 1 and the tuner 2. An audio signal reproduced by a playback head 51 is amplified by a preamplifier 52 and then fed through a volume control 54 to a power amplifier 55. The radio tuner 2 includes an electrical circuit 56, the output of which represents an intercepted signal, which is also fed through the volume control 54 to the power amplifier 55. The output of the power amplifier 55 is applied to a loudspeaker 57, providing an acoustic reproduction. The circuit includes a d.c. source 58 which is directly connected with the preamplifier 52 and the power amplifier 55, and is also connected with the electrical circuit 56 of the tuner 2 through a radio operating switch 59. In addition, the source 58 is connected with a tape drive motor 60 of the recorder through another switch 61 which is closed when the playback mode of the tape recorder 1 is established.

In this manner, the broadcast wave receiving operation of the radio set and the playback operation of the tape recorder are independently controlled by the switches 59, 61. When the switch 59 is closed, the electrical circuit 56 of the tuner is fed from the source 58 to activate the circuit for intercepting a desired broadcast signal, which is acoustically reproduced by the loudspeaker 57. When a playback actuating button, not shown, of the recorder 1 is operated to establish it in a playback mode, the switch 61 is closed by ganged operation, to energize the motor 60, whereby the tape recorder initiates its playback operation, producing an acoustic reproduction of a signal picked up by the playback head 51 from the loudspeaker 57. When both switches 59, 61 are closed and the tape recorder assumes a playback mode, the signal intercepting operation of the tuner and the playback operation of the recorder take place concurrently, whereby the loudspeaker produces a mixed output from the electrical circuit 56 and the playback head 51. In this manner, the starting position of the tape can be located while listening to a radio broadcast.

What is claimed is:

1. A radio frequency tuning device for use in a radio tuner which is adapted to be detachably coupled with a cassette tape recorder, the device comprising a radio frequency selecting dial rotatably disposed adjacent a surface of a tuner casing, a pulley disposed within the tuner casing and having the dial fixedly mounted thereon, a dial operating shaft rotatably mounted on a mounting plate which is fixedly mounted within said tuner casing and extending in a direction perpendicular to a sidewall of said tuner casing which is at right angles to said surface thereof, the free end of said shaft being exposed externally of the sidewall, a dial operating knob secured to the free end of said dial operating shaft, a diverting member fixedly disposed within the casing on the mounting plate in a right-angled corner of said casing defined by said surface and said sidewall of the tuner casing and having a pair of discrete string engaging portions, and a fastening string for coupling said pulley to said dial operating shaft, said fastening string passing around the respective string engaging portions of said diverting member to extend in mutually different directions on the opposite sides thereof, said diverting member comprising:

a rectangular body having a recess formed therein, said recess being defined by two parallel walls separated by a pillar portion extending therebetween along a direction perpendicular to said two parallel walls, said pillar portion including an arcuate, smooth surface defining one of said pair of string engaging portions; and a metal rod extending between said two parallel walls along a line perpendicular thereto and spaced from said arcuate, smooth surface, said metal rod defining the other of said pair of string engaging portions.

* * * * *